(12) United States Patent
Stocco

(10) Patent No.: US 9,970,509 B2
(45) Date of Patent: May 15, 2018

(54) ORBITLESS GEARBOX

(71) Applicant: Leo J. Stocco, Vancouver (CA)

(72) Inventor: Leo J. Stocco, Vancouver (CA)

(*) Notice: Subject to any disclaimer, the term of this patent is extended or adjusted under 35 U.S.C. 154(b) by 0 days. days.

(21) Appl. No.: 15/310,690

(22) PCT Filed: May 11, 2015

(86) PCT No.: PCT/CA2015/050423
§ 371 (c)(1),
(2) Date: Nov. 11, 2016

(87) PCT Pub. No.: WO2016/026032
PCT Pub. Date: Feb. 25, 2016

(65) Prior Publication Data
US 2017/0074354 A1   Mar. 16, 2017

Related U.S. Application Data

(60) Provisional application No. 62/048,776, filed on Sep. 10, 2014, provisional application No. 62/012,224, filed on Jun. 13, 2014, provisional application No. 61/991,700, filed on May 12, 2014.

(51) Int. Cl.
F16H 1/28    (2006.01)
F16H 57/08   (2006.01)
F16H 7/02    (2006.01)

(52) U.S. Cl.
CPC ............ *F16H 1/28* (2013.01); *F16H 7/02* (2013.01); *F16H 57/08* (2013.01); *F16H 57/082* (2013.01)

(58) Field of Classification Search
CPC ..... F16H 1/28; F16H 1/32; F16H 7/02; F16H 57/08; F16H 57/082
See application file for complete search history.

(56) References Cited

U.S. PATENT DOCUMENTS

| 4,762,025 A | 8/1988 | Lew | |
|---|---|---|---|
| 2006/0205557 A1* | 9/2006 | Arndt | F16H 1/22 475/331 |
| 2010/0072725 A1* | 3/2010 | Woellhaf | B60G 21/0555 280/124.107 |

FOREIGN PATENT DOCUMENTS

| EP | 0300108 A2 | 1/1989 |
|---|---|---|
| FR | 1053098 A | 1/1954 |
| GB | 2221278 A | 1/1990 |

* cited by examiner

Primary Examiner — Edwin A Young
(74) Attorney, Agent, or Firm — Banner & Witcoff, Ltd.

(57) ABSTRACT

An Epicyclic gearbox comprising one central gear, one or more offset gears and two carriers, requires one less gear than a planetary gearbox. It lacks an orbit gear and its planets maintain a fixed orientation as they circulate around the sun. The present invention provides a lower reduction ratio, reduced pitch velocity, higher torque capacity, and lower production cost than a planetary gearbox. An all-pinion design allows it to be fitted with gears, cables, chains, belts, or any other type of engaging means. Its high efficiency and low noise make it well suited to high speed operation and overdrive applications.

20 Claims, 11 Drawing Sheets

ORBITLESS GEARBOX

REFERENCE TO EARLIER FILED APPLICATIONS

The present application is a U.S. National Phase of International Application No. PCT/CA2015/050423, filed on May 11, 2015, designating the United States of America, and claims priority to U.S. Patent Application No. 61/991,700, filed May 12, 2014; U.S. Patent Application No. 62/012,224, filed Jun. 13, 2014; and U.S. Patent Application No. 62/048,776, filed Sep. 10, 2014. This application claims priority to and the benefit of the above-identified applications, each of which is fully incorporated by reference herein.

TECHNICAL FIELD

The disclosure herein relates to a gearbox comprising a plurality of gears or other engaging members. More particularly, it relates to an apparatus providing a drive member that rotates at a different rate as a driven member.

BACKGROUND

A typical planetary gearbox comprises a central pinion (sun), a central ring (orbit), and a group of offset pinions (planets) which ride on a carrier. It has advantages over an offset gearbox that include coaxial drive axes, high load capacity, and low pitch velocity (noise). These come at the expense of the production cost, friction, and reverse bending that result from the orbit ring. In addition, geometric constraints limit the minimum reduction ratio to 2:1 theoretically, and approximately 5:2 practically.

Variations on the planetary gearbox are plentiful and include the strain wave, cycloid, and nutating gearboxes. These configurations are more complex, less efficient and are typically used to satisfy special requirements such as anti-backlash or a high ratio.

The exemplary embodiments disclosed herein resemble an epicyclic gearbox with its orbit ring replaced by a second carrier which is cheaper to produce, creates less friction, and does not introduce reverse bending. A reduced pitch velocity generates less vibration and noise for improved high speed operation, and a minimum theoretical reduction ratio of 1:1 enables practical ratios of 5:4 or lower.

SUMMARY

Certain exemplary embodiments comprise a reference member, a front carrier, a rear carrier, and one or more offset members. The reference member comprises a central axis, a front carrier axis, and a rear carrier axis. The front carrier comprises one front central axis and a number of front offset axes equal to the number of offset members. The rear carrier comprises one rear central axis and a number of rear offset axes equal to the number of offset members. Each offset member comprises a front member axis and a rear member axis. All axes are parallel. The front and rear carrier axes are spaced apart by a carrier distance. Each front offset axis and the front central axis are spaced apart by an offset distance. Each rear offset axis and the rear central axis are spaced apart by the offset distance. All front offset axes are arranged circumferentially around the front central axis. All rear offset axes are arranged circumferentially around the rear central axis. All associated front and rear member axes are spaced apart by the carrier distance. The front central axis is co-axial and rotatably coupled to the front carrier axis. The rear central axis is co-axial and rotatably coupled to the rear carrier axis. Each front member axis is co-axial and rotatably coupled to a different front offset axis and each rear member axis is co-axial and rotatably coupled to a different rear offset axis.

Certain exemplary embodiments further comprise a central member which is co-axial and rotatably coupled to the central axis and all central and offset members are engaging members.

In certain exemplary embodiments, the central member simultaneously engages all offset members.

Certain exemplary embodiments further comprise one or more flexible couplings engaging the central member with all offset members.

In certain exemplary embodiments, the central axis is between the front and rear carrier axes.

In certain exemplary embodiments, the central and front carrier axes are co-axial.

In certain exemplary embodiments, the central and rear carrier axes are co-axial.

Certain exemplary embodiments comprise three offset members and all front and rear offset axes are circumferentially equally spaced around the associated front and rear central axes.

Certain exemplary embodiments comprise a reference member, a front carrier, a rear carrier, one or more offset members, and a central member. The reference member comprises a central axis, a front carrier axis, and a rear carrier axis which are all parallel, and wherein the front and rear carrier axes are spaced apart by a carrier distance. The front carrier comprises one front central axis and one front offset axis for each offset member, which are all parallel. All front offset axes are arranged circumferentially around, and spaced an offset distance away from, the front central axis. The rear carrier comprises one rear central axis and one rear offset axis for each offset member, which are all parallel. All rear offset axes are arranged circumferentially around, and spaced the offset distance away from, the rear central axis. Each offset member comprises a front member axis and a rear member axis which are parallel and spaced apart by the carrier distance. The front central axis is co-axial and rotatably coupled to the front carrier axis. The rear central axis is co-axial and rotatably coupled to the rear carrier axis. Each front member axis is co-axial and rotatably coupled to a different front offset axis. Each rear member axis is co-axial and rotatably coupled to a different rear offset axis. The central member is co-axial and rotatably coupled to the central axis. All of the central and offset members are engaging members and the central member simultaneously engages all offset members.

In certain exemplary embodiments, the central axis is between the front and rear carrier axes.

In certain exemplary embodiments, the central axis is co-axial with the front carrier axis.

In certain exemplary embodiments, the central axis is co-axial with the rear carrier axis.

In certain exemplary embodiments, a reference member, a front carrier, a rear carrier, and one or more offset members are provided. The reference member is provided with a central axis, a front carrier axis, and a rear carrier axis. The front carrier is provided with one front central axis and a number of front offset axes equal to the number of offset members. The rear carrier is provided with one rear central axis and a number of rear offset axes equal to the number of offset members. Each offset member is provided with a front member axis and a rear member axis. All axes are located whereby they are all parallel. The front and rear carrier axes are spaced apart by a carrier distance. Each front offset axis and the front central axis are spaced apart by an offset distance. Each rear offset axis and the rear central axis are spaced apart by the offset distance. All front offset axes are arranged circumferentially around the front central axis. All rear offset axes are arranged circumferentially around the rear central axis. All associated front and rear member axes are spaced apart by the carrier distance. The front central and front carrier axes are co-axially located, and rotatably coupled. The rear central and rear carrier axes are co-axially located, and rotatably coupled. Each front member axis and a different front offset axis are co-axially located, and rotatably coupled. Each rear member axis and a different rear offset axis are co-axially located, and rotatably coupled.

In certain exemplary embodiments, a central member is provided, co-axially located, and rotatably coupled to the central axis, and the central member and all offset members are provided with an engaging means.

In certain exemplary embodiments, the central member is simultaneously engaged with all offset members.

In certain exemplary embodiments, one or more flexible couplings are provided and simultaneously engaged with the central member and one or more offset members.

In certain exemplary embodiments, the central axis is located between the front and rear carrier axes.

In certain exemplary embodiments, the central axis is co-axially located with the front carrier axis.

In certain exemplary embodiments, the central axis is co-axially located with the rear carrier axis.

In certain exemplary embodiments, a total of three offset members are provided and all front and rear offset axes are circumferentially equally spaced around the associated front and rear central axes.

REFERENCE NUMERALS

Figure 1A:
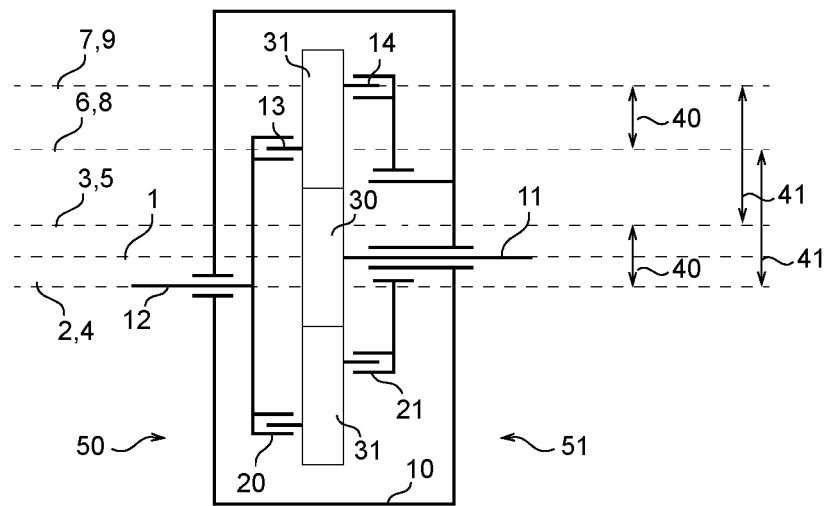
FIGS. 1A-1G are respectively, a schematic side view, a front view, a cross-sectional side view, two exploded perspective views, an internal front view, and an internal rear view, in accordance with a first exemplary embodiment depicting the present invention.
Figure 1B:
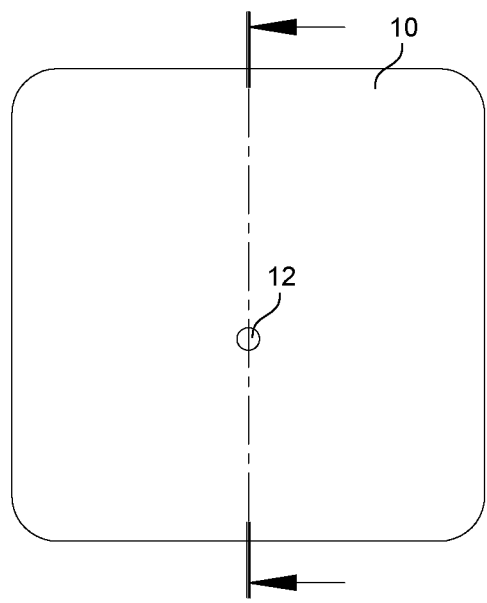
Figure 1C:
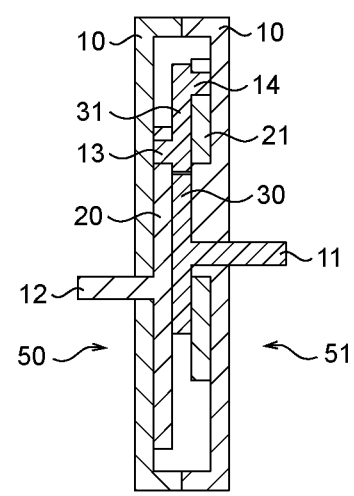
Figure 1D:
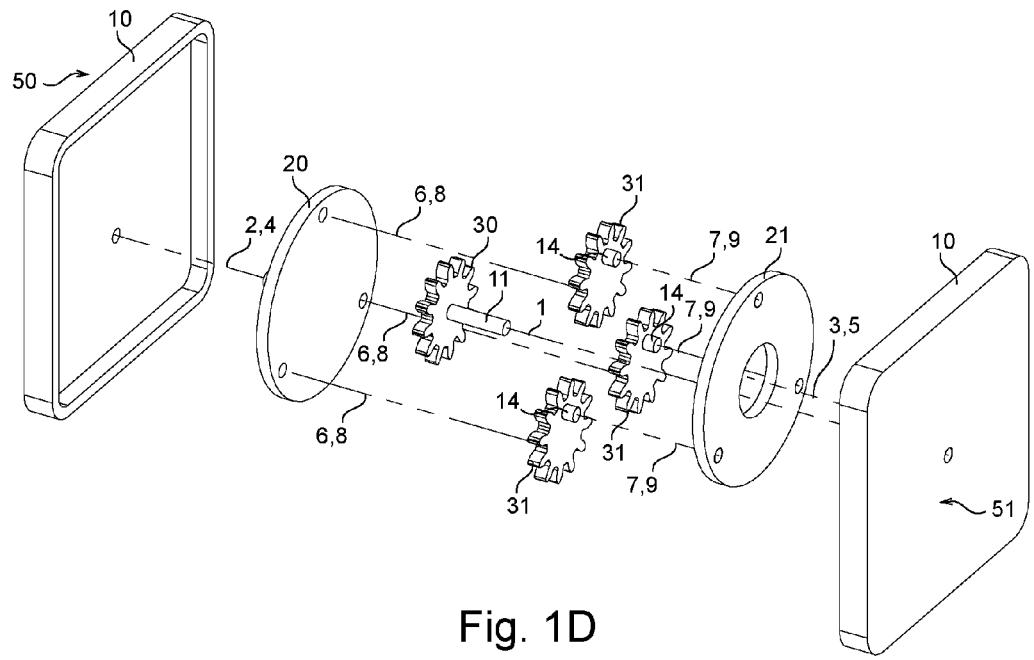
Figure 1E:
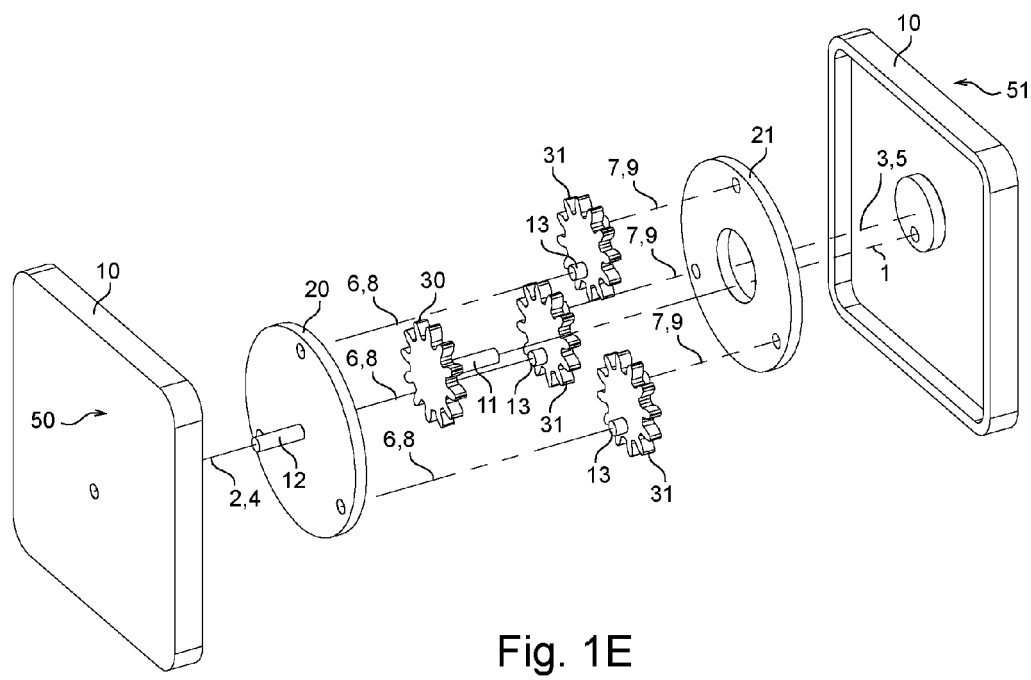
Figure 1F:
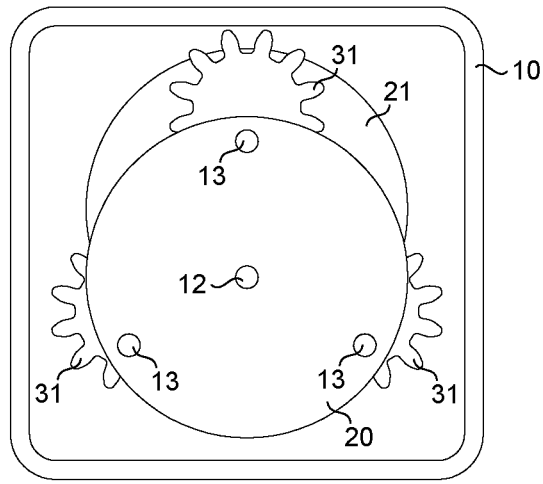
Figure 1G:
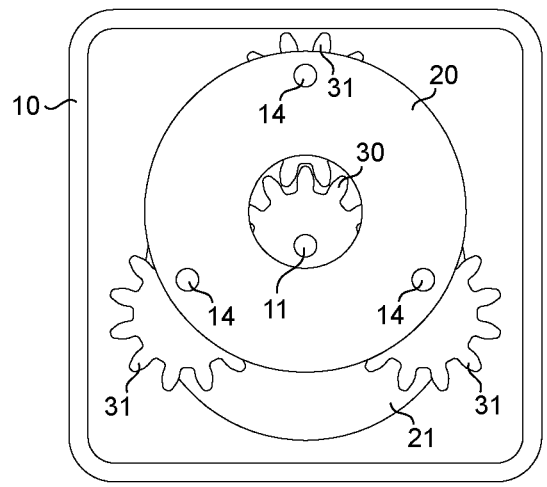

1—central axis
2—front carrier axis
3—rear carrier axis
4—front central axis
5—rear central axis
6—front offset axis
7—rear offset axis
8—front member axis
9—rear member axis
10—reference member
11—first drive-shaft
12—second drive-shaft
13—front shaft
14—rear shaft
20—front carrier
21—rear carrier
30—central member
31—offset member
32—flexible coupling
33—serpentine coupling
34—capstan cable coupling
40—carrier distance
41—offset distance
50—front
51—rear

DEFINITIONS

A gear, sprocket, pulley, friction or magnetic coupling, or any other type of member that engages and transmits power to a mate is defined as an engaging member.

An engaging member that engages on its exterior surface is defined as a pinion.

An engaging member that engages on its interior surface is defined as a ring.

A cable drive comprising two counter-acting, pre-loaded cables that are fixedly attached to two pulleys, is defined as a capstan cable coupling.

A chain, belt, cable, or any other means that changes shape while transmitting power between two or more engaging members is defined as a flexible coupling.

A flexible coupling that simultaneously couples three or more engaging members is defined as a serpentine coupling.

A member that is constrained to rotate about an axis by three or more tangential engaging members but by no other mechanical means is defined as floating.

Two parallel, offset shafts integrated by a connecting member is defined as a crankshaft.

An apparatus that scales the relative speed and torque of a drive and driven member is defined as a gearbox, whether or not it comprises any gears.

A gearbox that reduces velocity and amplifies torque is defined as a reduction gearbox.

A gearbox that amplifies velocity and reduces torque is defined as an overdrive gearbox.

A gearbox that may function as either a reduction or an overdrive gearbox is defined as back-drivable.

DESCRIPTION OF EMBODIMENTS

Wherever possible, the same reference numerals are used throughout the accompanying drawings and descriptions to refer to the same or similar parts. Components such as bearings, retainers and fasteners that do not substantially contribute to the understanding of the invention are neglected for the sake of simplicity.

Although spur gears, pulleys, belts and cables are depicted in the accompanying drawings, it is understood that many other engaging means would suffice, such as conical, radial, offset, spiral, helical, double helical, herring-bone, or roller tooth gears, friction or magnetic couplings, and chain drives. It is also understood that associated gears may comprise any face width, tooth profile, pressure angle, or module and may be made from metal, plastic, or any other appropriate material.

Although a male shaft and female race are used to depict a rotatable coupling in the accompanying drawings, it is understood that any other means will suffice, such as anti-friction bearings, bushings, or low friction coatings, materials, surface treatments or lubricants. It is also understood that the male and female members of a rotatable coupling may often be interchanged.

Although a shaft is used to depict a drive or driven member in the accompanying drawings, it is understood that any other means will suffice, such as an engaging member, a keyed, splined, or threaded hole, or a magnetic or electrostatic coupling.

Although three offset members 31 are depicted in certain accompanying drawings, it is understood that any number of offset members 31 may be included, as long as they do not mechanically interfere.

Although single-stage gearboxes are depicted in the accompanying drawings, it is understood that multiple gearboxes may be connected in series or in parallel and that the present invention may be combined with any other type of gearbox to obtain a desired speed ratio or other characteristic.

It is understood that a back-drivable gearbox may provide either reduction or overdrive gearing by interchanging the roles of its drive and driven members. In fact, the roles of the reference, drive member and driven member may all be interchanged to obtain a desired reduction or overdrive ratio, or to cause the drive and driven members to rotate in the same or opposite directions. Similarly, if any one is used as a drive member and the remaining two are used as driven members, a differential mechanism is obtained. Reduction, overdrive, differential, and reverse gearboxes are all contemplated.

It is understood that any one of the reference member 10, the central member 30, an offset member 31, or the front or rear carrier 20, 21, may act as the reference with any other member acting as the drive or driven member.

A representative sample of embodiments is included in the accompanying drawings for exemplary purposes only. A great number of additional tooth geometries, ring and pinion combinations and kinematic arrangements are also contemplated. The scope of the present invention is not limited to the embodiments included but spans all possible combinations anticipated by the specification and claims.

FIGS. 1A-1G illustrate a first exemplary embodiment of the present invention providing a reduction ratio between a first drive-shaft 11 and a second drive-shaft 12.

The first exemplary embodiment comprises a reference member 10, a front carrier 20, a rear carrier 21, a central member 30, and three equivalent offset members 31.

The reference member 10 acts as the case of the gearbox and comprises a central axis 1, a front carrier axis 2, and a rear carrier axis 3, all of which are parallel. The front carrier axis 2 is spaced apart from the rear carrier axis 3 by a carrier distance 40, and the central axis 1 is mid-way between the front carrier axis 2 and rear carrier axis 3.

The front carrier 20 comprises a front central axis 4 and three front offset axes 6, which are circumferentially equally spaced, and spaced an offset distance 41 away from the front central axis 4. The front carrier 20 and second drive-shaft 12 are co-centric and integral.

The second carrier 21 comprises a rear central axis 5 and three rear offset axes 7, which are circumferentially equally spaced, and spaced an offset distance 41 away from the rear central axis 5.

The front central axis 4 is rotatably coupled to the front carrier axis 2 and the rear central axis 5 is rotatably coupled to the rear carrier axis 3.

Each offset member 31 comprises a front shaft 13 defining a front member axis 6 and a rear shaft 14 defining a rear member axis 7. The front and rear member axes 6, 7 are parallel and spaced apart by the carrier distance 40. The center of each offset member 31 is mid-way between the associated front and rear member axes 6, 7.

Each front member axis 8 is rotatably coupled to a different front offset axis 6 and each rear member axis 9 is rotatably coupled to a different rear offset axis 7.

The central member 30 and first drive-shaft 11 are co-centric and integral. The first drive-shaft 11 is rotatably coupled to the central axis 1.

The central member 30 and all offset members 31 are all substantially equivalent pinion gears. The central member 30 simultaneously engages all offset members 31 providing a fixed, non-slip reduction ratio between the first and second drive-shafts 11, 12.

Figure 2:
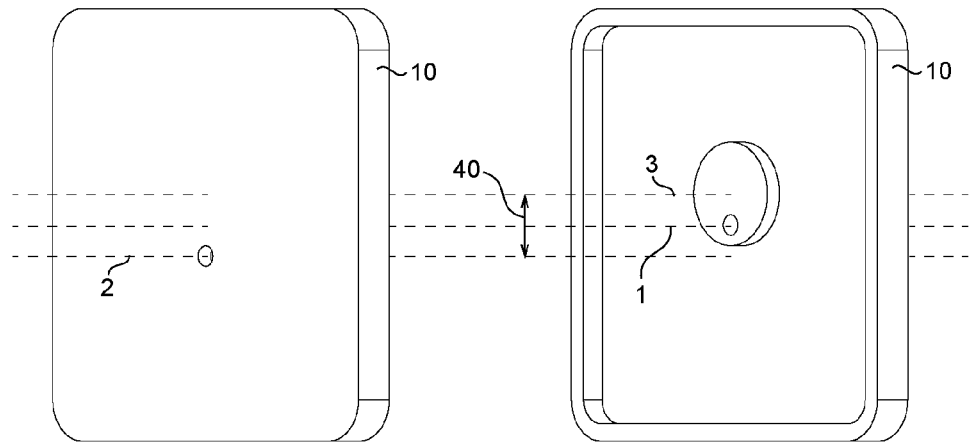
FIG. 2 is a perspective view of a reference member and its associated axes.

FIG. 2 illustrates the reference member 10, the locations of the central, front carrier, and rear carrier axes 1, 2, 3, and the carrier distance 40 separating the front and rear carrier axes 2, 3. The reference member 10 is depicted as two halves but in practice, they would be integral or fastened together.

Figure 3:
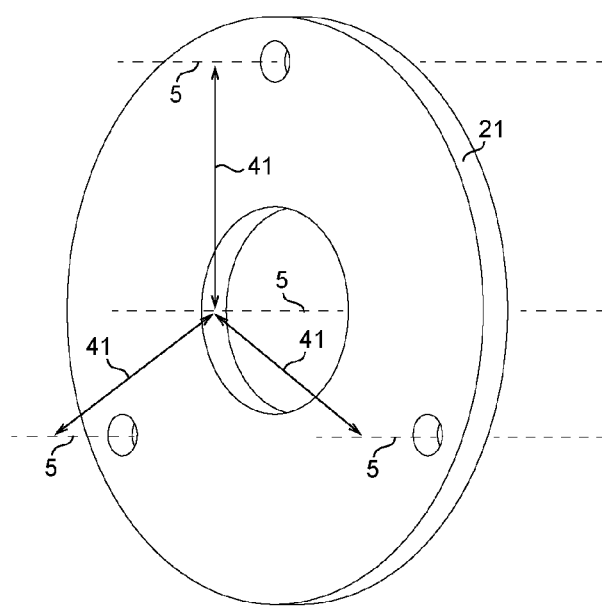
FIG. 3 is a perspective view of a rear carrier and its associated axes.

FIG. 3 illustrates the rear carrier 21, the locations of the front central and front offset axes 4, 6, and the offset distance 41 separating them.

Figure 4:
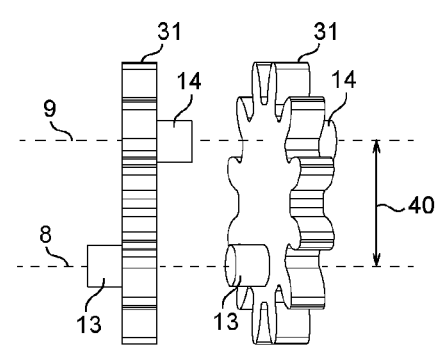
FIG. 4 is a side and perspective view of an offset member and its associated axes.

FIG. 4 illustrates an offset member 31, the locations of the front and rear member axes 6, 7, and the carrier distance 40 separating them.

FIGS. 5A-5D illustrate the effect of rotating the first drive-shaft 11 to four incremental angles. Rotating the integral central member 30 causes the engaged offset members 31 to circulate around the central axis 1 at a fixed orientation. The circulating offset members 31 cause the front carrier 20, the integral second drive-shaft 12, and the rear carrier 21, to rotate in unison and in the same direction as the first drive-shaft 11, but at half the rate. As a reduction gear, the first drive-shaft 11 is the drive shaft, the second drive-shaft 12 is the driven shaft, and the reduction ratio is 2:1.

When the central member 30 is rotated 30°, 60° and 90° respectively, the front and rear carriers 20, 21, advance 15°, 30° and 45° respectively, while all offset members 31 maintain a fixed orientation. Selected teeth on the central and offset members 30, 31 are marked in the associated figures to illustrate orientation.

Figure 6:
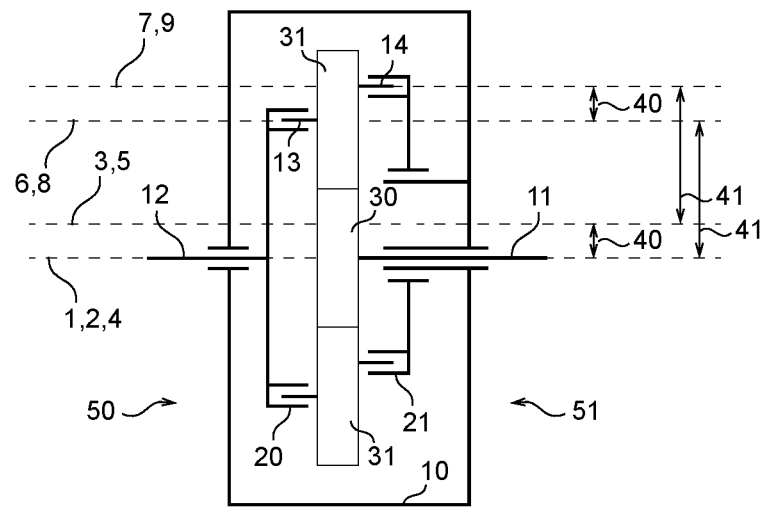
FIG. 6 is a schematic side view in accordance with a second exemplary embodiment depicting the present invention comprising co-axial central and front carrier axes.

FIG. 6 illustrates a second exemplary embodiment of the present invention which is similar to the first exemplary embodiment except for the following. The central axis 1 is co-axial with the front carrier axis 2 and each front member axis 6 intersects the center of the associated offset member 31. This configuration provides co-axial first and second drive-shafts 11, 12.

Figure 7:
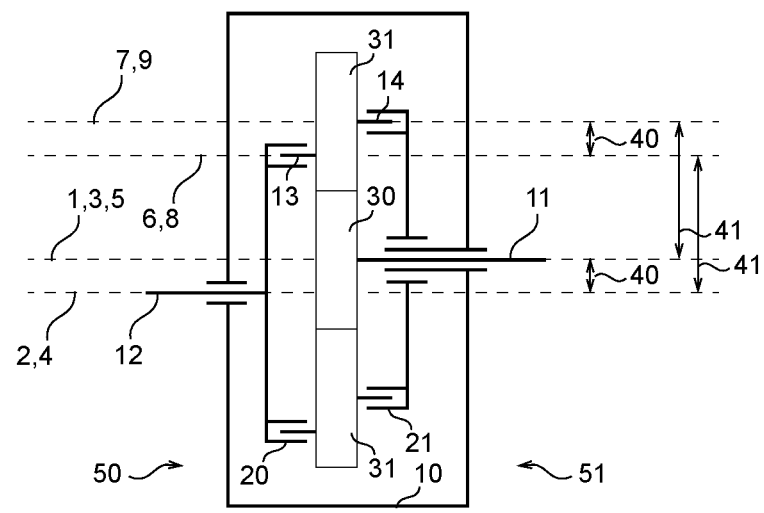
FIG. 7 is a schematic side view in accordance with a third exemplary embodiment depicting the present invention comprising co-axial central and rear carrier axes.

FIG. 7 illustrates a third exemplary embodiment of the present invention which is similar to the first exemplary embodiment except for the following. The central axis 1 is co-axial with the rear carrier axis 3 and each rear member axis 7 intersects the center of the associated offset member 31. This configuration provides a co-axial first drive-shaft 11 and rear carrier 21.

Figure 8:
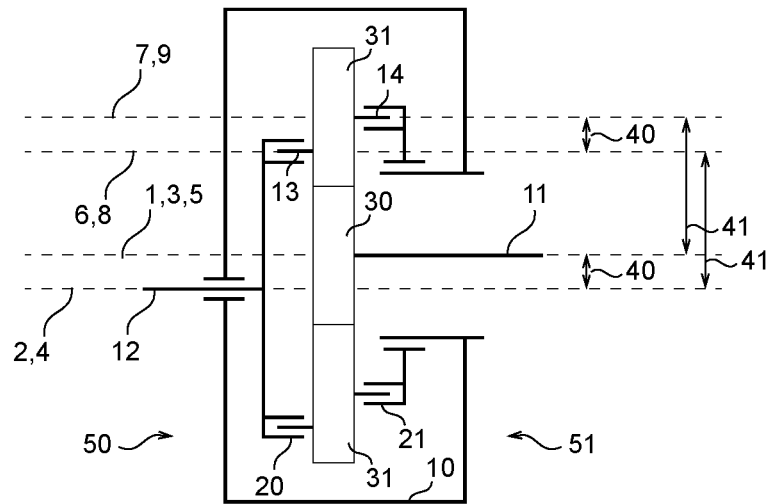
FIG. 8 is a schematic side view in accordance with a fourth exemplary embodiment depicting the present invention comprising a floating central member.

FIG. 8 illustrates a fourth exemplary embodiment of the present invention which is similar to the third exemplary embodiment except for the following. The central member 30 is floating. This configuration allows self-alignment of the central member 30.

Figure 9:
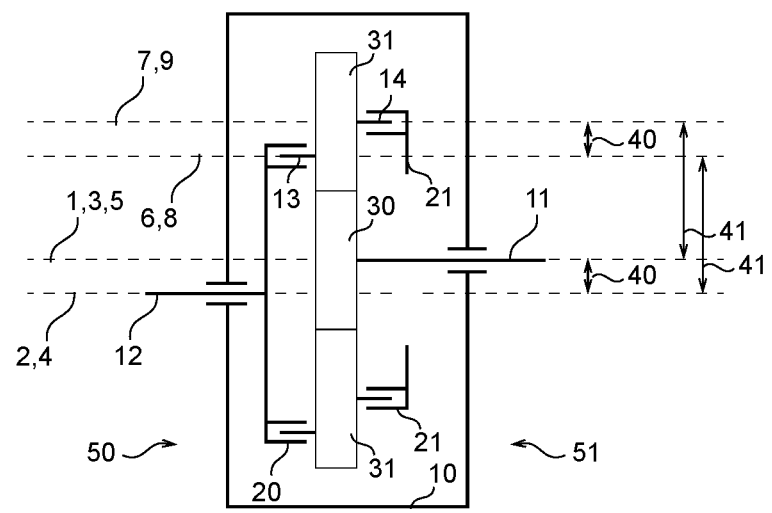
FIG. 9 is a schematic side view in accordance with a fifth exemplary embodiment depicting the present invention comprising a floating rear carrier.

FIG. 9 illustrates a fifth exemplary embodiment of the present invention which is similar to the third exemplary embodiment except for the following. The rear carrier 21 is floating. This configuration allows self-alignment of the offset members 31.

Figure 10:
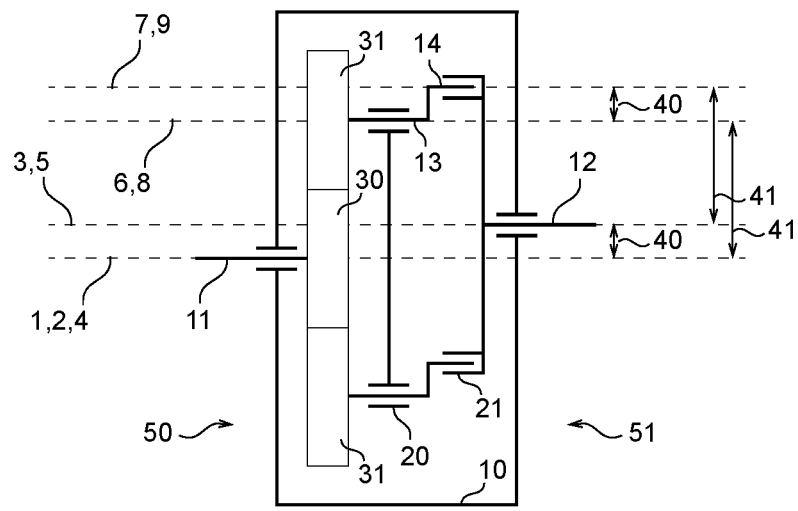
FIG. 10 is a schematic side view in accordance with a sixth exemplary embodiment depicting the present invention comprising offset members with crank-shafts.

FIG. 10 illustrates a sixth exemplary embodiment of the present invention which is similar to the first exemplary embodiment except for the following. The central and offset members 30, 31, are to one side of the front and rear carriers 20, 21. Each pair of front and rear shafts 13, 14 are integrated into a crank-shaft that penetrates a floating front carrier 20 to reach the rear carrier 21. This configuration provides cantilever central and offset members 30, 31.

Figure 11:
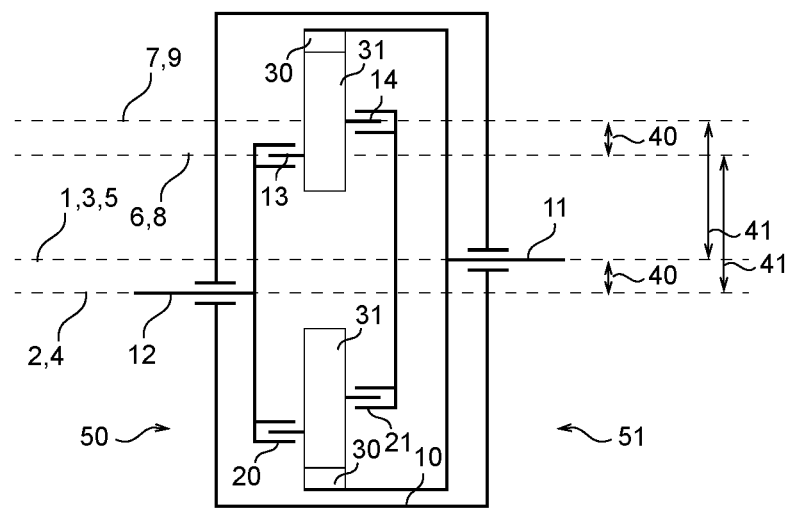
FIG. 11 is a schematic side view in accordance with a seventh exemplary embodiment depicting the present invention comprising a ring central member.

FIG. 11 illustrates a seventh exemplary embodiment of the present invention which is similar to the fifth exemplary embodiment except for the following. The central member 30 is a ring instead of a pinion. This configuration provides an overdrive ratio.

Figure 12:
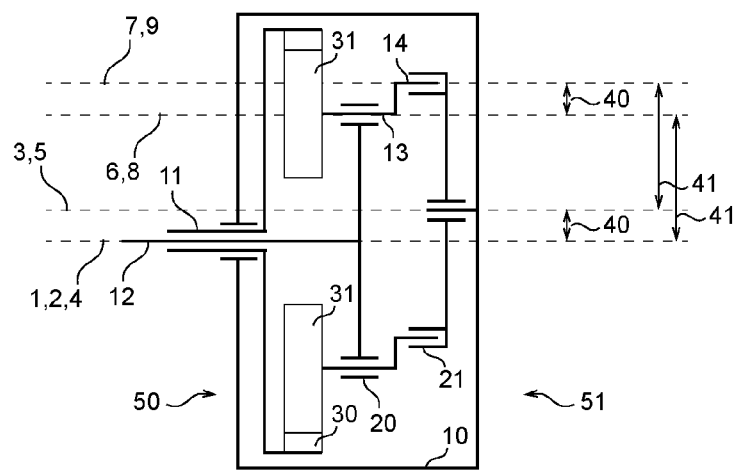
FIG. 12 is a schematic side view in accordance with an eighth exemplary embodiment depicting the present invention comprising offset members with crank-shafts and a ring central member.

FIG. 12 illustrates an eighth exemplary embodiment of the present invention which is similar to the sixth exemplary embodiment except for the following. The central member 30 is a ring instead of a pinion and a hollow first drive-shaft 11 exits the front 50 of the reference member 10. This configuration provides an overdrive ratio and overlapping first and second drive-shafts 11, 12.

Figure 13:
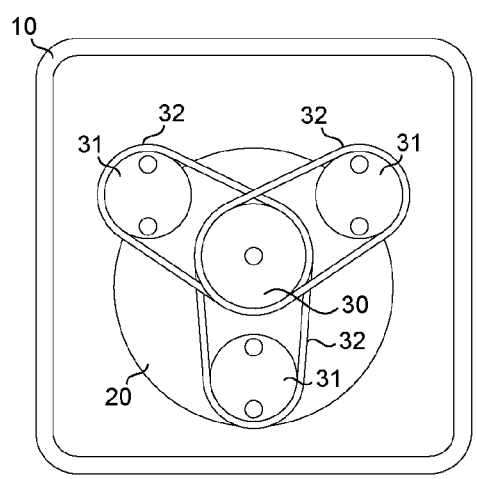
FIG. 13 is a partial outline view in accordance with a ninth exemplary embodiment depicting the present invention comprising plural flexible couplings.

FIG. 13 illustrates a ninth exemplary embodiment of the present invention which is similar to the first exemplary embodiment except for the following. The central member 30 and each offset member 31 are engaged by a flexible coupling 32.

Figure 14:
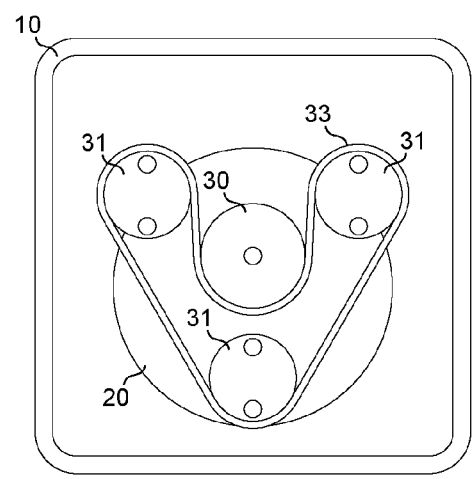
FIG. 14 is a partial outline view in accordance with a tenth exemplary embodiment depicting the present invention comprising a serpentine coupling.
Figure 15A:
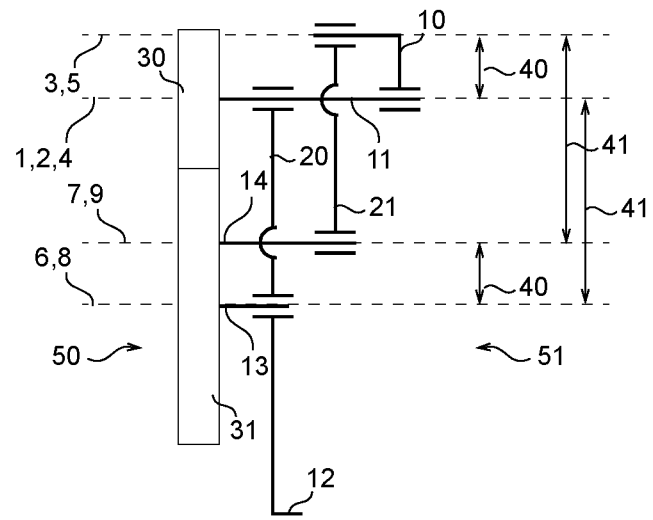
FIGS. 15A-15D are respectively, a schematic side view, a perspective view, and two rear views, in accordance with an eleventh exemplary embodiment depicting the present invention comprising a single offset member and a capstan cable coupling.
Figure 15B:
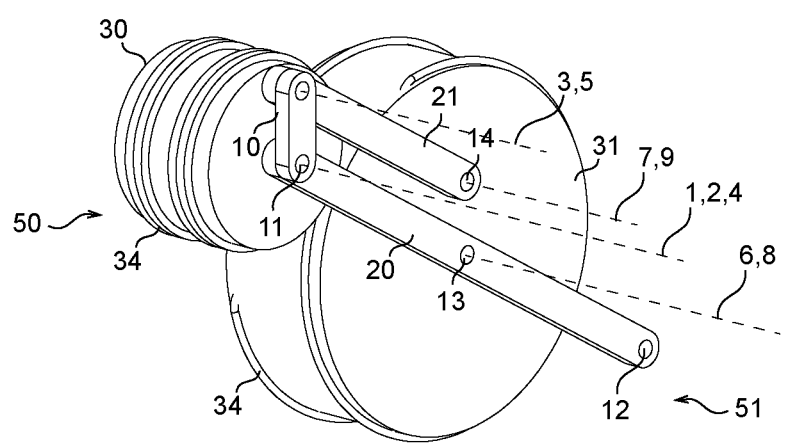
Figure 15C:
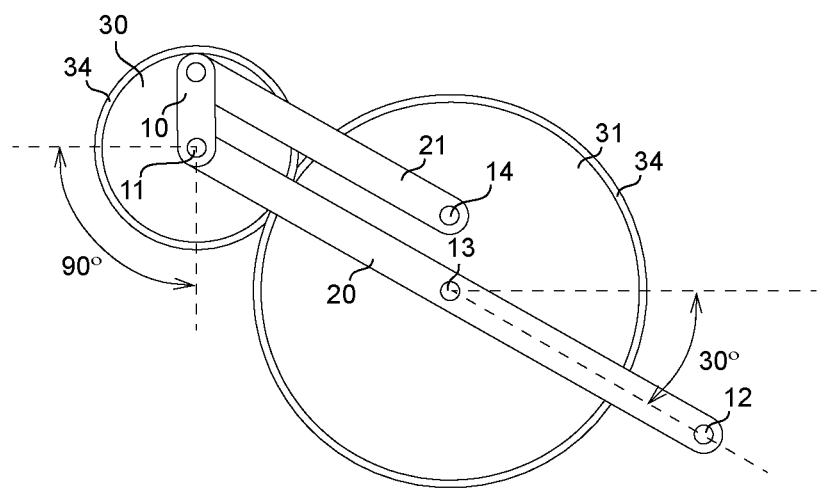
Figure 15D:
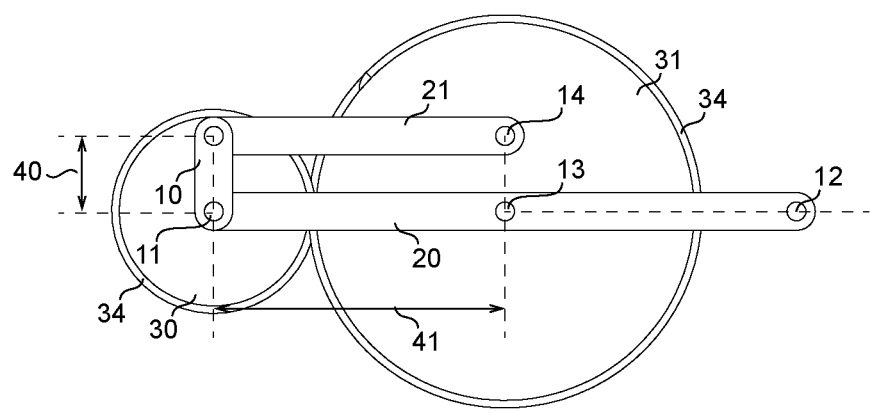

FIG. 14 illustrates a tenth exemplary embodiment of the present invention which is similar to the first exemplary embodiment except for the following. The central member 30 and all offset members 31 are engaged by a serpentine coupling 33.

FIGS. 15A-D illustrate an eleventh exemplary embodiment of the present invention which is similar to the first exemplary embodiment except for the following. A single offset member 31 acts as the fixed reference and is engaged with the central member 30 by a capstan cable coupling 34.

Figure 5A:
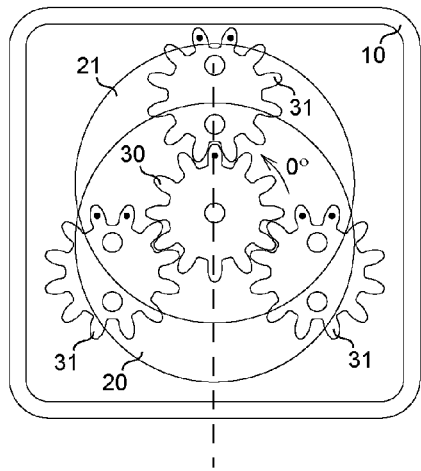
FIGS. 5A-5D are four partial outline views, in accordance with a first exemplary embodiment depicting the present invention advanced to four incremental angles.
Figure 5B:
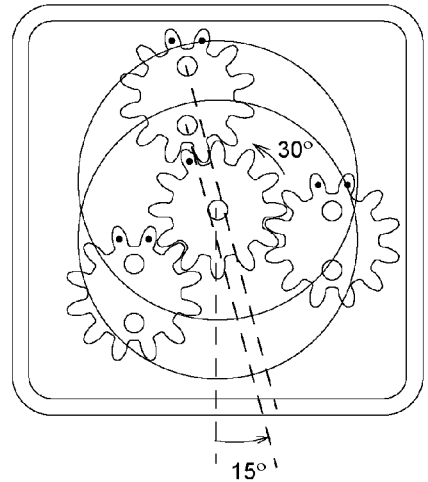
Figure 5C:
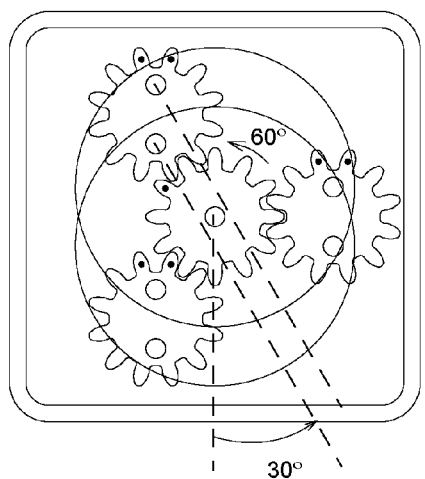
Figure 5D:
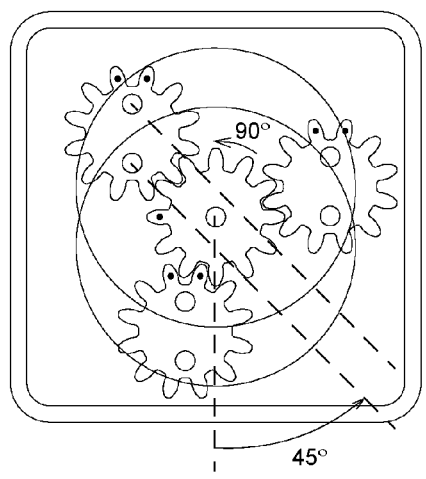

FIGS. 5C-5D illustrate the effect of rotating the first drive-shaft 11 with respect to the reference member 10. The central member 30 simultaneously rotates and circulates around the offset member 31 while the reference member 10 circulates at a fixed orientation. The second drive-shaft 12 also circulates and may be attached to a load to counterbalance the mass of the central member 30, and possibly an actuator which may be integral with the reference member 10.

EXAMPLES

In each of the following examples, the reduction ratio is RR=T1:T2=T1/T2:1 and the overdrive ratio is RR'=1/RR where T1 is the number of turns of the first drive-shaft 11 and T2 is the corresponding number of turns of the second drive-shaft 12, all with respect to the reference member 10. RR is computed from Pc and Po, which are the pitch diameter of the central member 30, and offset members 31, respectively. When the engaging members are gears, Pc and Po are integer multiples of the tooth module.

When all engaging members are pinions, RR and RR' are as follows.

$$RR = 1 + \frac{P_o}{P_c}:1 \quad RR' = \frac{P_c}{P_c + P_o}:1$$

When the central member 30 is a ring gear or when it is a pinion engaging a flexible coupling, RR and RR' are as follows.

$$RR = 1 - \frac{P_o}{P_c}:1 \quad RR' = \frac{P_c}{P_c - P_o}:1$$

When the central member 30 and offset members 31 are spur gears, the offset distance (OD) 41 for normal engagement is as follows.

$$OD = \frac{P_c + P_o}{2}$$

When friction couplings, magnetic couplings, or gears with a small tooth module are used, the following constraints avoid mechanical interference between adjacent offset members 31. For large tooth modules, these must be adjusted accordingly.

$P_o<6P_c$ Pinion central engaging member
$13P_o<6P_c$ Ring central engaging member The following ratios satisfy the above constraints and are theoretically possible in a single stage, although a unity RR requires an infinitely large Pc in either case.

1:1<RR<7:1 Pinion central engaging member
53:100<RR<1:1 Ring central engaging member A first example considers the first through sixth and eleventh exemplary embodiments illustrated in FIGS. 1-10 and 15 where the central member 30 is a pinion.

Pc=Po=12 and RR=2:1.

A second, third, and fourth example demonstrate that different ratios may be obtained by changing the engaging members only. In all three examples, OD remains constant so the same reference member 10 and carriers 20, 21 may be used.

Pc=Po=30, OD=30 and RR=2:1.
Pc=33, Po=27, OD=30 and RR=19:10.
Pc=27, Po=33, OD=30 and RR=222:100.

A fifth example considers the seventh and eighth exemplary embodiment illustrated in FIGS. 11 and 12 where the central member 30 is a ring.

Pc=30, Po=12, RR=6:10 and RR'=167:100.

A sixth example considers the ninth and tenth exemplary embodiments illustrated in FIGS. 13 and 14. A flexible or serpentine coupling 32, 33 engages the pinions so pitch diameters may not necessarily be integer multiples of a particular tooth module.

Pc=10, Po=9.9 and RR'=100:1.

Although certain exemplary embodiments depict the second drive-shaft 12 and front carrier 20 as integral, both carriers 20, 21 rotate in unison so the second drive-shaft 12 could instead be integral with the rear carrier 21.

Although certain exemplary embodiments depict all offset members 31 as being substantially equivalent, it is understood that they need not be. For example, if the number of teeth on a gear central member 30 is not an integer multiple of the number of offset members 31 and all offset members 31 are circumferentially equally spaced around the central axis 1, then the locations of the front and rear member axes 8, 9 on all offset members 31 will not be uniform. They must be out of phase with respect to the gear teeth to make the gearbox assemble-able.

It is understood that the offset members 31 may have non-uniform front and rear member axes 8, 9 as long as the associated front and rear offset axes 6, 7 are similarly non-uniform, although vibration may result from the associated imbalance.

Although certain exemplary embodiments depict all offset members 31 as being circumferentially equally spaced around the central axis 1, it is understood that they need not be, although vibration may result from the associated imbalance.

Although certain exemplary embodiments depict a front and rear carrier 20, 21, that are either floating or rotatably coupled about their centers, it is understood that rotational coupling could often be provided between the interior of the case 10 and the exterior of the associated front or rear carrier 20, 21, or by other means.

Certain exemplary embodiments depict front and rear carriers 20, 21 that occupy the same plane. This is possible when there are a small number of offset members 31, but mechanical interference may limit the associated motion range of the apparatus.

Advantages

The exemplary embodiments disclosed herein have a number of advantageous properties.

Certain exemplary embodiments comprise only pinions which are economical to manufacture and may engage flexible couplings.

Certain exemplary embodiments operate with low pitch velocity resulting in high efficiency, low vibration, and quiet operation at high speeds.

Certain exemplary embodiments provide a reduction ratio with a theoretical lower limit of unity, making any desired reduction ratio possible.

Certain exemplary embodiments do not experience reverse bending which provides high load capacity and durability.

Certain exemplary embodiments may be configured for offset or co-axial drive axes.

Certain exemplary embodiments have an easily accommodated assembly criteria and may be configured to include sequential meshing and hunting teeth for low vibration, quiet operation, and uniform break-in.

Other advantages are apparent from the disclosure herein.

The invention claimed is:

1. An apparatus comprising:
   a reference member, a front carrier, a rear carrier, and one or more offset members;
   the reference member comprises a central axis, a front carrier axis, and a rear carrier axis;
   the front carrier comprises one front central axis and a number of front offset axes equal to the number of offset members;
   the rear carrier comprises one rear central axis and a number of rear offset axes equal to the number of offset members;
   each offset member comprises a front member axis and a rear member axis;
   and wherein:
   all axes are parallel;
   the front and rear carrier axes are spaced apart by a carrier distance;
   each front offset axis and the front central axis are spaced apart by an offset distance;
   each rear offset axis and the rear central axis are spaced apart by the offset distance;
   all front offset axes are arranged circumferentially around the front central axis;
   all rear offset axes are arranged circumferentially around the rear central axis;
   all associated front and rear member axes are spaced apart by the carrier distance;
   the front central axis is co-axial and rotatably coupled to the front carrier axis;
   the rear central axis is co-axial and rotatably coupled to the rear carrier axis;
   each front member axis is co-axial and rotatably coupled to a different front offset axis;
   and each rear member axis is co-axial and rotatably coupled to a different rear offset axis.

2. The apparatus of claim 1 further comprising a central member which is co-axial and rotatably coupled to the central axis and wherein all central and offset members are engaging members.

3. The apparatus of claim 2 wherein the central member simultaneously engages all offset members.

4. The apparatus of claim 2 further comprising one or more flexible couplings engaging the central member with all offset members.

5. The apparatus of claim 1 wherein the central axis is between the front and rear carrier axes.

6. The apparatus of claim 1 wherein the central and front carrier axes are co-axial.

7. The apparatus of claim 1 wherein the central and rear carrier axes are co-axial.

8. The apparatus of claim 1 comprising three offset members and wherein all front and rear offset axes are circumferentially equally spaced around the associated front and rear central axes.

9. An apparatus comprising:
a reference member, a front carrier, a rear carrier, one or more offset members, and a central member;
the reference member comprises a central axis, a front carrier axis, and a rear carrier axis which are all parallel, and wherein the front and rear carrier axes are spaced apart by a carrier distance;
the front carrier comprises one front central axis and one front offset axis for each offset member, which are all parallel;
all front offset axes are arranged circumferentially around, and spaced an offset distance away from, the front central axis;
the rear carrier comprises one rear central axis and one rear offset axis for each offset member, which are all parallel;
all rear offset axes are arranged circumferentially around, and spaced the offset distance away from, the rear central axis;
each offset member comprises a front member axis and a rear member axis which are parallel and spaced apart by the carrier distance;
and wherein:
the front central axis is co-axial and rotatably coupled to the front carrier axis;
the rear central axis is co-axial and rotatably coupled to the rear carrier axis;
each front member axis is co-axial and rotatably coupled to a different front offset axis;
each rear member axis is co-axial and rotatably coupled to a different rear offset axis;
the central member is co-axial and rotatably coupled to the central axis;
all of the central and offset members are engaging members;
and the central member simultaneously engages all offset members.

10. The apparatus of claim 9 wherein the central axis is between the front and rear carrier axes.

11. The apparatus of claim 9 wherein the central axis is co-axial with the front carrier axis.

12. The apparatus of claim 9 wherein the central axis is co-axial with the rear carrier axis.

13. A method comprising:
providing a reference member, a front carrier, a rear carrier, and one or more offset members;
providing the reference member with a central axis, a front carrier axis, and a rear carrier axis;
providing the front carrier with one front central axis and a number of front offset axes equal to the number of offset members;
providing the rear carrier with one rear central axis and a number of rear offset axes equal to the number of offset members;
providing each offset member with a front member axis and a rear member axis;
locating all axes whereby they are all parallel;
spacing the front and rear carrier axes apart by a carrier distance;
spacing each front offset axis and the front central axis apart by an offset distance;
spacing each rear offset axis and the rear central axis apart by the offset distance;
arranging all front offset axes circumferentially around the front central axis;
arranging all rear offset axes circumferentially around the rear central axis;
spacing all associated front and rear member axes apart by the carrier distance;
co-axially locating, and rotatably coupling the front central and front carrier axes;
co-axially locating, and rotatably coupling the rear central and rear carrier axes;
co-axially locating, and rotatably coupling each front member axis and a different front offset axis;
and co-axially locating, and rotatably coupling each rear member axis and a different rear offset axis.

14. The method of claim 13 wherein a central member is provided, co-axially located, and rotatably coupled to the central axis, and the central member and all offset members are provided with an engaging means.

15. The method of claim 14 wherein the central member is simultaneously engaged with all offset members.

16. The method of claim 14 wherein one or more flexible couplings are provided and simultaneously engaged with the central member and one or more offset members.

17. The method of claim 13 wherein the central axis is located between the front and rear carrier axes.

18. The method of claim 13 wherein the central axis is co-axially located with the front carrier axis.

19. The method of claim 13 wherein the central axis is co-axially located with the rear carrier axis.

20. The method of claim 13 wherein a total of three offset members are provided and all front and rear offset axes are circumferentially equally spaced around the associated front and rear central axes.

* * * * *